United States Patent
Itagaki et al.

(10) Patent No.: US 12,512,123 B2
(45) Date of Patent: Dec. 30, 2025

(54) BASE PLATE, SPINDLE MOTOR, DISK DRIVE DEVICE, AND BASE PLATE MANUFACTURING METHOD

(71) Applicant: NIDEC CORPORATION, Kyoto (JP)

(72) Inventors: Genya Itagaki, Kyoto (JP); Kenta Miyoshi, Kyoto (JP); Michihiro Ito, Kyoto (JP); Takashi Mitsunari, Kyoto (JP); Ryo Furuya, Kyoto (JP); Seiji Maruoka, Kyoto (JP); Masahiro Imahori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 18/657,797

(22) Filed: May 8, 2024

(65) Prior Publication Data

US 2024/0379122 A1 Nov. 14, 2024

(30) Foreign Application Priority Data

May 12, 2023 (JP) .................. 2023-079560
Jun. 28, 2023 (JP) .................. 2023-106524

(51) Int. Cl.
G11B 19/20 (2006.01)

(52) U.S. Cl.
CPC ................ G11B 19/2009 (2013.01)

(58) Field of Classification Search
None
See application file for complete search history.

(56) References Cited

U.S. PATENT DOCUMENTS

| | | | |
|---|---|---|---|
| 7,251,100 B1* | 7/2007 | Frees | G11B 19/20 |
| 8,107,195 B2 | 1/2012 | Sugiki | |
| 8,441,759 B2 | 5/2013 | Sugiki | |
| 8,482,881 B2 | 7/2013 | Sugiki | |
| 8,564,908 B2 | 10/2013 | Sugiki | |
| 8,760,810 B2 | 6/2014 | Sugiki | |
| 8,970,987 B2 | 3/2015 | Sugiki | |
| 9,336,817 B1* | 5/2016 | Hirasawa | G11B 25/043 |
| 10,102,882 B1* | 10/2018 | Ino | G11B 5/4813 |
| 11,456,012 B1* | 9/2022 | Showa | G11B 33/022 |
| 2001/0045782 A1* | 11/2001 | Lieu | H02K 15/12 |
| | | | 310/67 R |
| 2008/0020185 A1* | 1/2008 | Macatangay | G11B 33/08 |
| | | | 428/161 |

(Continued)

FOREIGN PATENT DOCUMENTS

| | | | | |
|---|---|---|---|---|
| JP | 2015112016 | | 6/2015 | |
| KR | 20030021961 A | * | 3/2003 | G11B 25/043 |

Primary Examiner — William J Klimowicz
(74) Attorney, Agent, or Firm — JCIPRNET

(57) ABSTRACT

A base plate becomes a part of a housing of a disk drive device and is made of a metal die-cast member. The base plate includes a bottom wall portion and a cylindrical wall portion. The bottom wall portion extends perpendicular to a rotation axis of a disk extending in a vertical direction. The cylindrical wall portion protrudes upward from an upper surface of the bottom wall portion along the rotation axis and has a shaft through hole through which a shaft is inserted. The cylindrical wall portion has an annular stepped portion that protrudes radially outward from an outer peripheral surface of a root portion. A processed surface is formed on at least a part of an outer peripheral surface of the stepped portion.

20 Claims, 11 Drawing Sheets

(56) References Cited

U.S. PATENT DOCUMENTS

| | | | |
|---|---|---|---|
| 2012/0250184 A1* | 10/2012 | Inoue | G11B 25/043 |
| | | | 29/603.03 |
| 2015/0131181 A1 | 5/2015 | Sugiki | |
| 2015/0187391 A1* | 7/2015 | Smirnov | G11B 25/043 |
| | | | 360/99.08 |
| 2017/0186467 A1* | 6/2017 | Akagi | G11B 25/043 |
| 2018/0174610 A1* | 6/2018 | Shimomura | G11B 5/012 |
| 2018/0315449 A1* | 11/2018 | Suginobu | F16C 33/1045 |
| 2018/0315450 A1* | 11/2018 | Shimomura | G11B 19/2036 |
| 2018/0374514 A1* | 12/2018 | Akagi | G11B 33/148 |
| 2019/0093234 A1* | 3/2019 | Sakurada | C25D 13/22 |
| 2020/0005826 A1* | 1/2020 | Showa | H02K 15/14 |
| 2021/0272603 A1* | 9/2021 | Uehara | G11B 33/1446 |
| 2022/0068305 A1* | 3/2022 | Showa | G11B 25/043 |
| 2022/0130428 A1* | 4/2022 | Suzuki | G11B 33/02 |
| 2022/0262408 A1* | 8/2022 | Ito | B22D 19/10 |
| 2023/0290378 A1* | 9/2023 | Nakane | G11B 21/16 |
| 2023/0298624 A1* | 9/2023 | Okamoto | G11B 25/043 |
| | | | 360/78.04 |
| 2024/0087614 A1* | 3/2024 | Nakane | G11B 33/124 |
| 2024/0087615 A1* | 3/2024 | Miyata | G11B 33/022 |
| 2024/0274158 A1* | 8/2024 | Showa | G11B 25/043 |
| 2025/0006227 A1* | 1/2025 | Ito | H02K 5/06 |

\* cited by examiner

BASE PLATE, SPINDLE MOTOR, DISK DRIVE DEVICE, AND BASE PLATE MANUFACTURING METHOD

CROSS REFERENCE TO RELATED APPLICATIONS

The present invention claims priority under 35 U.S.C. § 119 to Japanese Application No. 2023-079560 filed on May 12, 2023 and 2023-106524 filed on Jun. 28, 2023 the entire content of which is incorporated herein by reference.

FIELD OF THE INVENTION

The disclosure relates to a base plate, a spindle motor, a disk drive device, and a base plate manufacturing method.

BACKGROUND

A base plate that is a part of a housing of a conventional disk drive device is made of a metal die-cast member, and includes a bottom wall portion and a cylindrical wall portion. The bottom wall portion extends perpendicularly to a rotation axis of the disk that extends in the vertical direction. The cylindrical wall portion protrudes upward from an upper surface of a bottom plate portion along the rotation axis, and has a shaft through hole through which the shaft is inserted.

However, in the conventional base plate, shrinkage cavities may be generated in the cylindrical wall portion during casting. As a result, there was a possibility that a gas filled inside the housing could leak to the outside through shrinkage cavities formed in the cylindrical wall portion. In addition, there was a possibility that shrinkage cavities would be exposed on a peripheral surface of the shaft through hole to thereby reduce the surface accuracy of the shaft through hole. As a result, since the shaft was press-fitted at an angle to the rotation axis, there was a possibility that a part of the peripheral surface of the shaft through hole would be scraped. At this time, since the shaft may easily come out from the inside of the cylindrical wall portion, there is a possibility that shavings may be interposed between the cylindrical wall portion and the shaft to thereby cause the gas filled inside the housing to leak to the outside. Further, there was a possibility that the distance between the disk and the head would be misaligned due to the shaft inclined with respect to the rotation axis. Accordingly, there was a possibility that a disk read error or disk write error would occur.

SUMMARY

An exemplary base plate of the disclosure becomes a part of a housing of a disk drive device and is made of a metal die-cast member. The base plate includes a bottom wall portion and a cylindrical wall portion. The bottom wall portion extends perpendicular to a rotation axis of the disk extending in the vertical direction. The cylindrical wall portion protrudes upward from the upper surface of the bottom wall portion along the rotation axis and has a shaft through hole through which a shaft is inserted. The cylindrical wall portion has an annular stepped portion that protrudes radially outward from an outer peripheral surface of a root portion. A processed surface is formed on at least a part of an outer peripheral surface of the stepped portion.

An exemplary base plate manufacturing method of the disclosure is a method of manufacturing a base plate as a part of a housing of a disk drive device including a casting step and a cutting step. The casting step integrally casts a bottom wall portion and a cylindrical wall portion using a mold. The bottom wall portion extends perpendicular to the rotation axis of the disk extending vertically and has a rectangular shape when viewed from the axial direction. The cylindrical wall portion protrudes upward from the upper surface of the bottom wall portion along the rotation axis and disposes a shaft therein. In the cutting step, the cylindrical wall portion is cut and shaped. In the casting step, the cylindrical wall portion is integrally formed with an annular stepped portion protruding radially outward from an outer peripheral surface of a root portion. The stepped portion has a thick portion that protrudes from at least a part of the outer peripheral surface and spans an upper surface of the stepped portion. In the cutting step, the thick portion is cut and a cut surface is formed on at least a part of an outer peripheral surface of the stepped portion.

The above and other elements, features, steps, characteristics and advantages of the disclosure will become more apparent from the following detailed description of the preferred embodiments with reference to the attached drawings.

DETAILED DESCRIPTION

Hereinafter, exemplary embodiments of the disclosure will be described in detail with reference to the drawings. In this specification, a direction parallel to a rotation axis J of a disk 50 is referred to as the "axial direction," a direction perpendicular to the rotation axis J is referred to as the "radial direction," and a direction along an arc centered on the rotation axis J is referred to as the "circumferential direction", respectively. In this application, the shape and positional relationship of each part will be described with the axial direction as the vertical direction and the side of a cover 42 with respect to a base plate 41 as the top. However, this definition of the vertical direction is not intended to limit the orientation of the base plate 41 and disk drive device 1 according to the disclosure in use.

Figure 1:
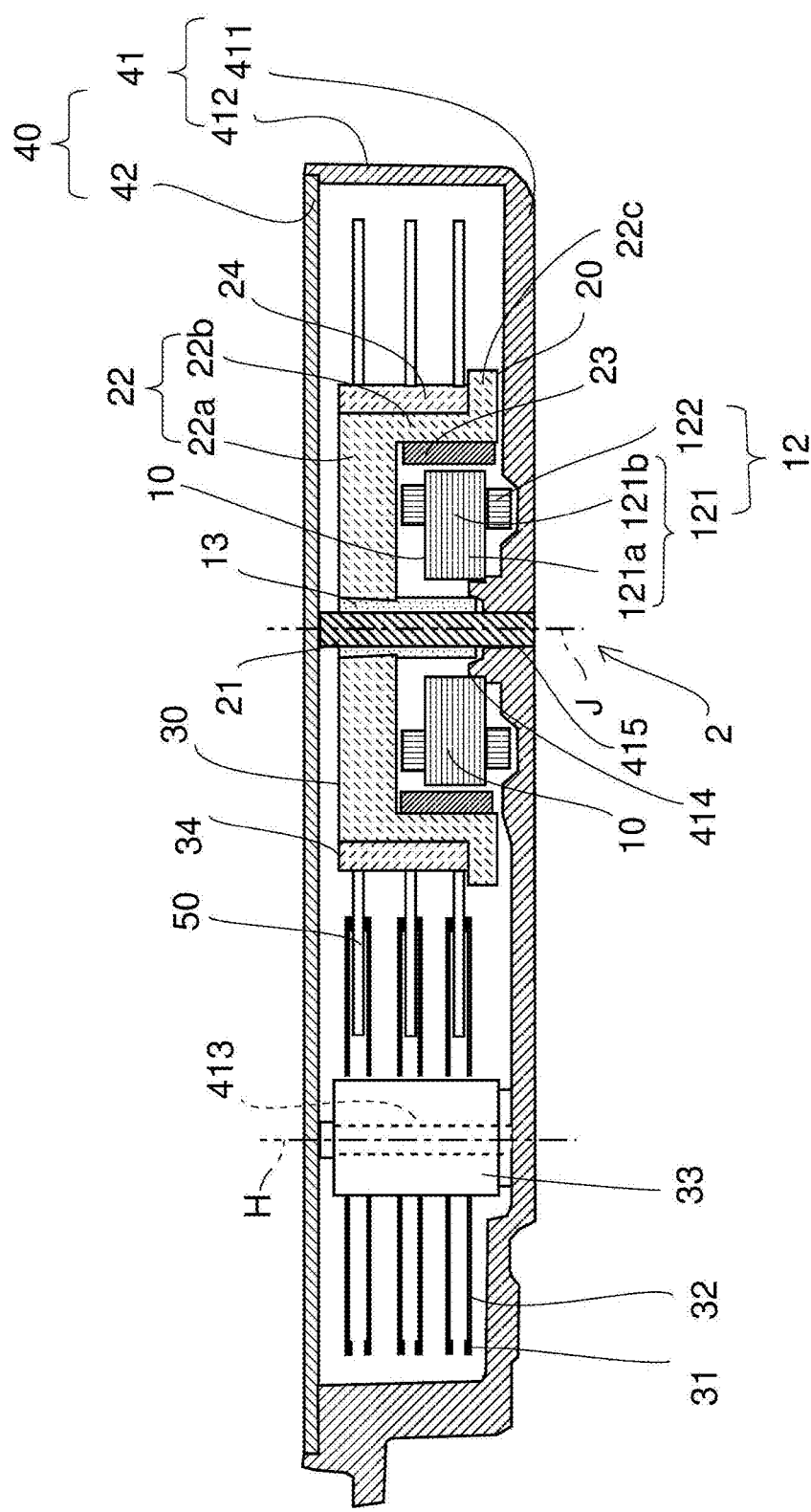
FIG. 1 is a longitudinal sectional view of a disk drive device according to an embodiment of the disclosure.

The disk drive device 1 according to an exemplary embodiment of the disclosure will be described. FIG. 1 is a longitudinal sectional view of the disk drive device 1 according to the embodiment of the disclosure.

The disk drive device 1 is a hard disk drive. The disk drive device 1 includes a spindle motor 2, a disk 50, a head 31, an arm 32, a swing mechanism 33, and a housing 40.

The housing 40 accommodates the spindle motor 2, the disk 50, the head 31, the arm 32, and the swing mechanism 33 therein.

The inside of the housing 40 is filled with a gas having a lower density than air.

Accordingly, it is possible to reduce airflow resistance inside the housing 40 and reduce vibration of the disk 50. Specifically, the housing is filled with a helium gas. A hydrogen gas or the like may be filled instead of the helium gas.

The housing 40 is formed of a die-cast member made of aluminum alloy. The die-cast member may be made of metal other than aluminum alloy.

The housing 40 includes a base plate 41 and a cover 42. The disk 50, the spindle motor 2, and the swing mechanism 33 are arranged on the base plate 41 inside the housing 40. The opening at the upper portion of the base plate 41 is closed by the cover 42. The base plate 41 will be described in detail later.

The spindle motor 2 supports the disk 50 and rotates the disk 50 around the rotation axis J. That is, the disk 50 rotates about the rotation axis J extending in the vertical direction by the spindle motor 2. The spindle motor 2 includes a stationary part 10 and a rotating part 20. The stationary part 10 is stationary with respect to the housing 40. The rotating part 20 is rotatably supported with respect to the stationary part 10.

The stationary part 10 includes a shaft 21 and a stator 12. Further, a part of the base plate 41 constitutes the stationary part 10. That is, the spindle motor 2 includes the base plate 41. The base plate 41 extends perpendicularly to the rotation axis J on the lower side of the rotating part 20. The base plate 41 is a part of the spindle motor 2 and also a part of the housing 40. The stator 12 and a bearing unit 13 are fixed to the base plate 41.

The shaft 21 is a columnar metal member extending in the axial direction. The lower end of the shaft 21 is fixed to the base plate 41. In this embodiment, the base plate 41 includes a cylindrical wall portion 414. The cylindrical wall portion 414 protrudes upward from the upper surface of a bottom wall portion 411 of the base plate 41 along the rotation axis J. The shaft 21 is press-fitted and fixed inside the cylindrical wall portion 414. That is, the shaft 21 is disposed inside the cylindrical wall portion 414.

The stator 12 includes a stator core 121 that is a magnetic material and a plurality of coils 122. The stator core 121 includes an annular core back 121a and a plurality of teeth 121b. The core back 121a is disposed to surround the rotation axis J and the teeth 121b fixed to the base plate 41 protrude radially outward from the outer peripheral surface of the core back 121a and are arranged at a plurality of positions in the circumferential direction. The plurality of coils 122 is configured by conductive wires wound around the teeth 121b.

The bearing unit 13 is disposed on the outer peripheral portion of the shaft 21 and rotatably supports a hub (rotor) 22 on the side of the rotating part 20. For example, a fluid dynamic pressure bearing mechanism is used for the bearing unit 13.

The rotating part 20 includes the hub 22 and a magnet 23. The hub 22 includes a top surface portion 22a and a cylindrical surface portion 22b. The top surface portion 22a is disposed on the outer peripheral portion of the bearing unit 13 and expands radially outward. The cylindrical surface portion 22b is formed into a cylindrical shape extending in the axial direction, and has a flange portion 22c extending radially outward from the lower end. The plurality of disks 50 is arranged in line in the axial direction on the outer peripheral surface of the cylindrical surface portion 22b.

The magnet 23 is fixed to the inner peripheral surface of the cylindrical surface portion 22b, and is disposed to face the stator 12 at a predetermined distance on the outside in the radial direction. The magnet 23 has an annular shape, and N poles and S poles are alternately magnetized in the circumferential direction on the inner peripheral surface of the magnet 23.

When a drive current is supplied to the coil 122, magnetic flux is generated in the plurality of teeth 121b. At this time, magnetic flux interacts between the teeth 121b and the magnet 23, and circumferential torque is generated. Accordingly, the rotating part 20 rotates about the rotation axis J with respect to the stationary part 10. The disk 50 supported by the hub 22 rotates about the rotation axis J together with the rotating part 20.

The disk 50 is a disc-shaped information recording medium with a hole in the center. The disks 50 are mounted on the spindle motor 2 and are arranged parallel to each other and at equal intervals in the axial direction with the spacer 24 interposed therebetween.

The head 31 magnetically reads and writes information from and to the disk 50. The arm 32 is attached to a tip of a pivot post 413 via a bearing (not shown). The head 31 is disposed at a tip of the arm 32.

The pivot post 413 protrudes upward from the upper surface of the bottom wall portion 411 of the base plate 41 to be described later along the swing axis H, and is formed in a cylindrical shape.

The swing mechanism 33 is a mechanism for swinging the arm 32 and the head 31.

When the swing mechanism 33 is driven, the head 31 swings about the swing axis H via the arm 32. At this time, the head 31 moves relative to the disk 50 and approaches the rotating disk 50 to access the disk.

Figure 2:
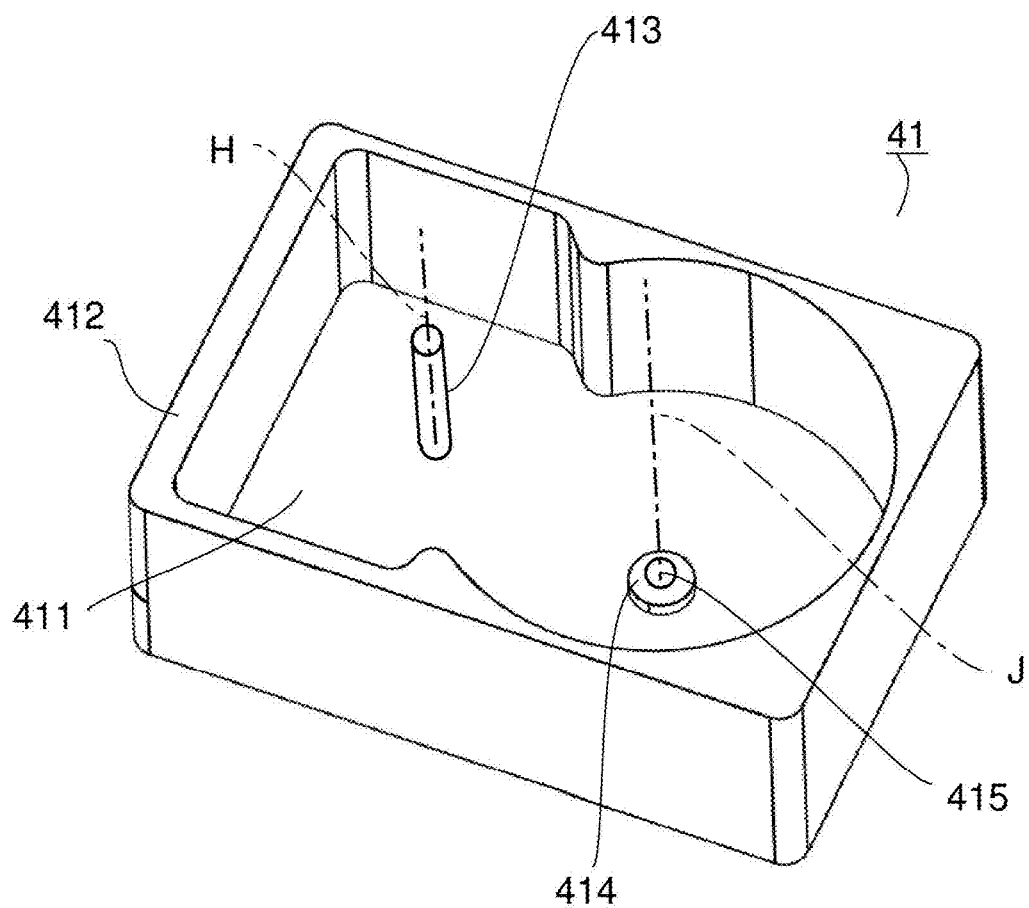
FIG. 2 is a perspective view schematically showing a base plate according to the embodiment of the disclosure.

FIG. 2 is a perspective view schematically showing the base plate 41. The base plate 41 includes the bottom wall portion 411, a peripheral wall portion 412, the pivot post 413, the cylindrical wall portion 414, and a shaft through hole 415.

In this embodiment, the bottom wall portion 411, the peripheral wall portion 412, the pivot post 413, and the cylindrical wall portion 414 are integrally formed as a cast product. Furthermore, the bottom wall portion 411 and the peripheral wall portion 412 are integrally formed as a cast product, but the base plate 41 may be configured by assembling the bottom wall portion 411 and the peripheral wall portion 412 which are each cast as separate members.

The bottom wall portion 411 has a rectangular shape when viewed from the axial direction, and extends perpendicularly to the rotation axis J and the swing axis H that extend in the vertical direction. The cylindrical wall portion 414 protrudes upward from the upper surface of the bottom wall portion 411 along the rotation axis J, and has the shaft through hole 415 in which the shaft 21 is disposed. The shaft through hole 415 is disposed on the rotation axis J and penetrates the bottom wall portion 411 in the axial direction. The shaft 21 is press-fitted into the shaft through hole 415 to fix the bottom wall portion 411 and the shaft 21. At this time, the cylindrical wall portion 414 holds the shaft 21.

The peripheral wall portion 412 extends upward in the axial direction from the outer peripheral edge of the bottom wall portion 411 and surrounds the bottom wall portion 411. The cover 42 is screwed onto the upper end surface of the peripheral wall portion 412.

The pivot post 413 protrudes upward from the upper surface of the bottom wall portion 411 along the swing axis H. The swing mechanism 33 is supported by the bottom wall portion 411 via the pivot post 413.

Figure 3:
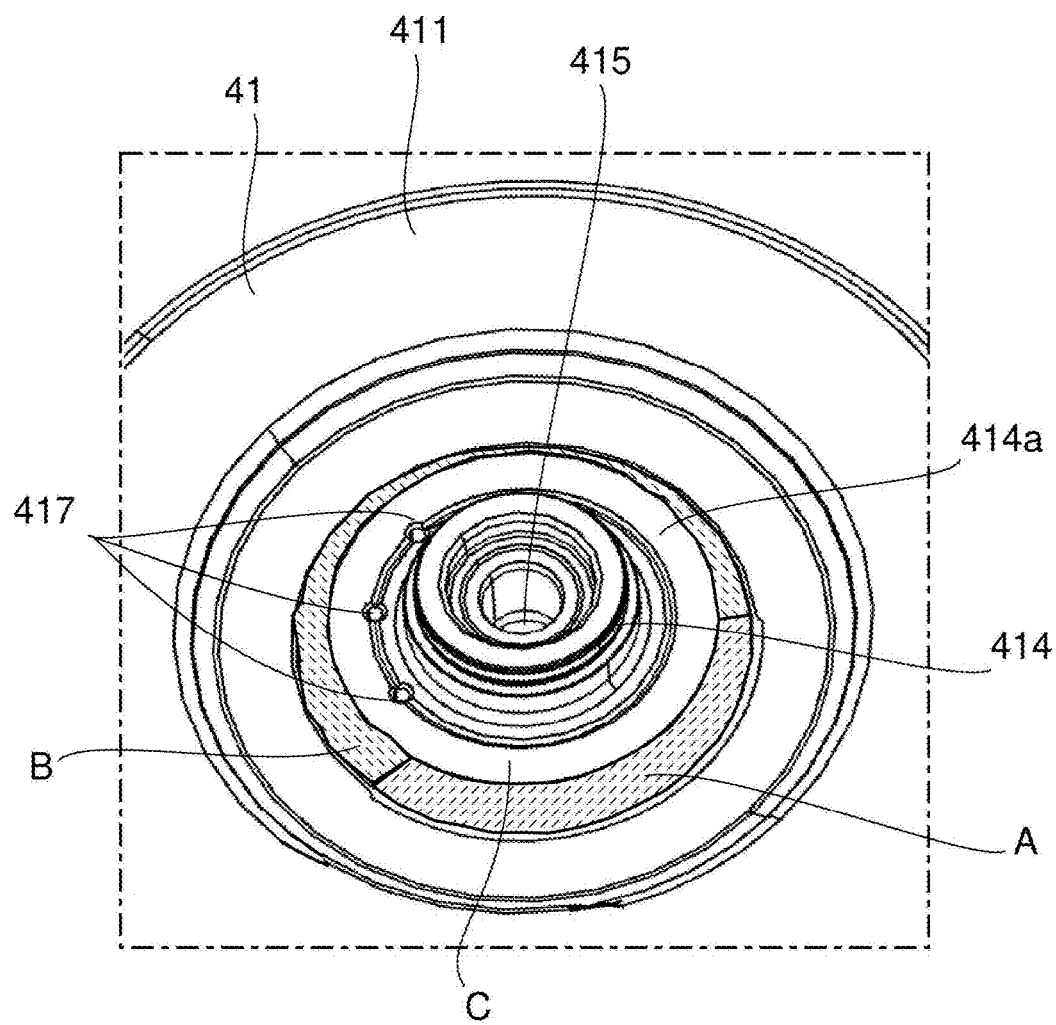
FIG. 3 is an enlarged perspective view of a part of the base plate according to the embodiment of the disclosure.
Figure 4:
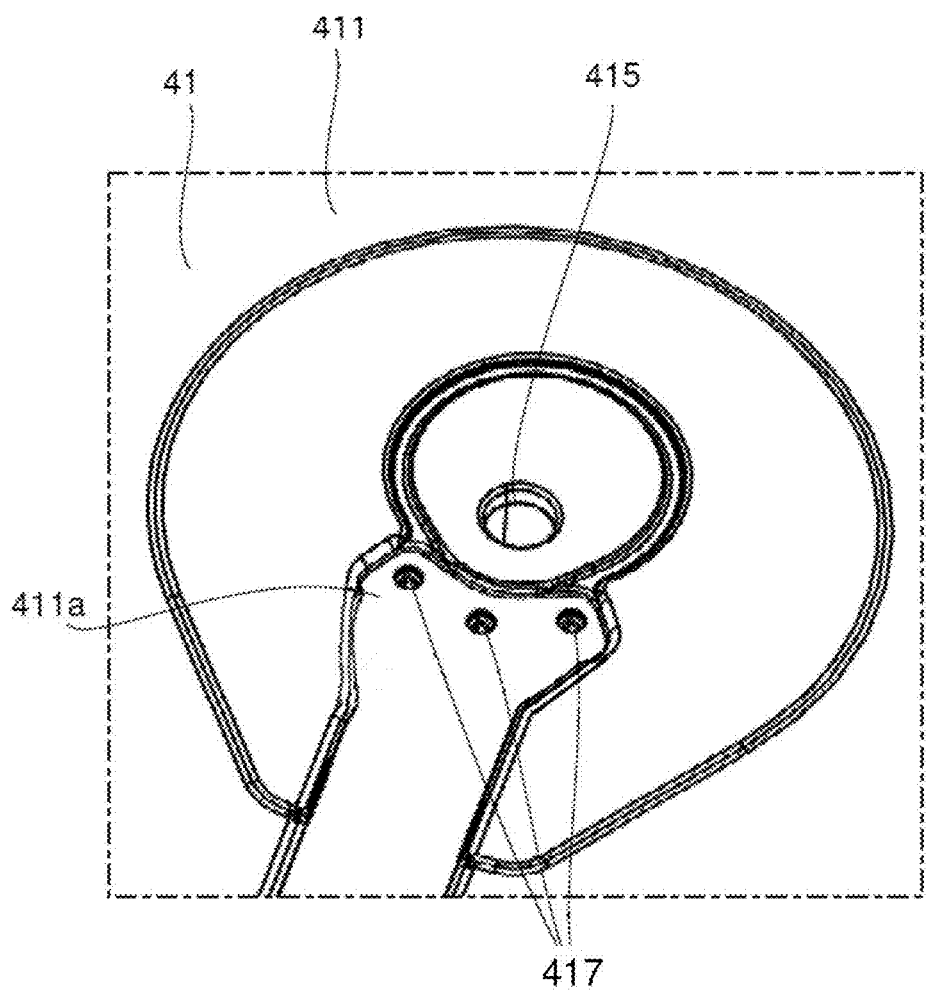
FIG. 4 is an enlarged perspective view of a part of the base plate according to the embodiment of the disclosure.
Figure 5:
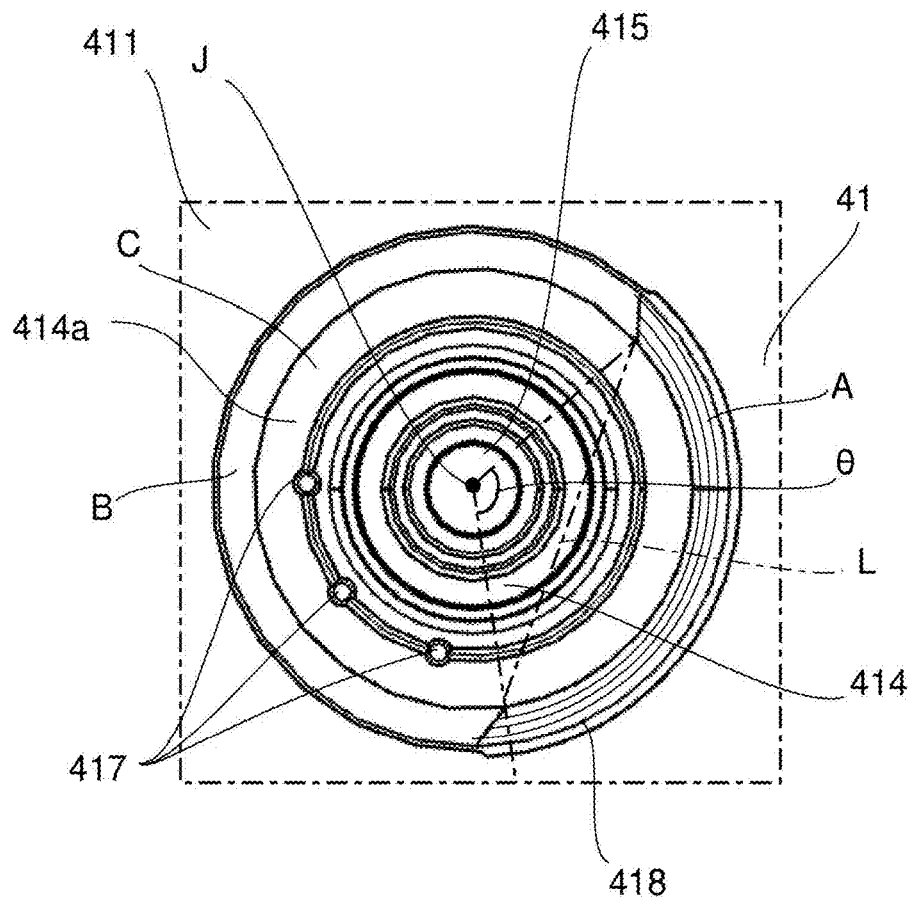
FIG. 5 is an enlarged plan view of a part of the base plate according to the embodiment of the disclosure.
Figure 6:
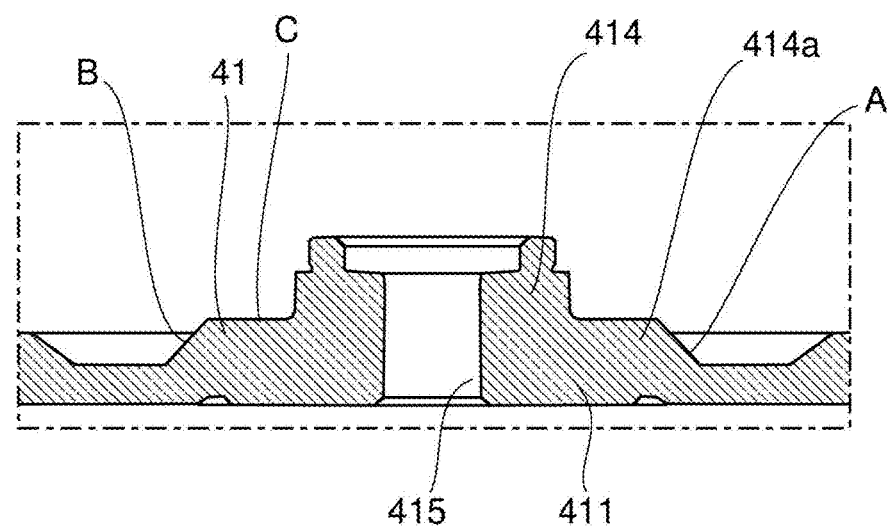
FIG. 6 is an enlarged longitudinal sectional view of a part of the base plate according to the embodiment of the disclosure.

FIGS. 3 and 4 are enlarged perspective views showing the periphery of the cylindrical wall portion 414 of the base plate 41, FIG. 3 shows the base plate 41 when viewed from above, and FIG. 4 shows the base plate 41 when viewed from below. FIG. 5 is an enlarged plan view showing the periphery of the cylindrical wall portion 414 of the base plate 41 and FIG. 6 is a longitudinal sectional view showing the periphery of the cylindrical wall portion 414 of the base plate 41. In FIG. 3, the processed surface A and the cast surface B are shown with hatching for description, and a cutting mark 418 is not shown. On the other hand, in FIG. 5, the processed surface A and the cast surface B are not shown with hatching for description, but the cutting mark 418 is shown.

The cylindrical wall portion 414 includes a stepped portion 414a. The stepped portion 414a is formed in an annular shape and protrudes radially outward from the outer peripheral surface of the root portion of the cylindrical wall portion 414. The bottom portion of the stepped portion 414a is formed integrally with the upper portion of the bottom wall portion 411.

In this embodiment, the stepped portion 414a has the processed surface A and the cast surface B on the outer peripheral surface thereof. That is, the cut surface A is formed on at least a part of the outer peripheral surface of the stepped portion 414a. The processed surface A may be formed on the entire outer peripheral surface of the stepped portion 414a.

The processed surface A is an area that is cut in a second cutting step (cutting step) in a method of manufacturing the base plate 41, which will be described later. The processed surface A is provided with the cutting mark 418. The cutting marks 418 extend linearly in the circumferential direction around the shaft through hole 415 and are formed as a plurality of lines in the radial direction. The cast surface B is an unprocessed area adjacent to the processed surface A in the circumferential direction on the outer peripheral surface of the stepped portion 414a and is not cut after casting. The processed surface A and the cast surface B are covered with an electrodeposition coating film 41a, which will be described later. Further, the surface roughness on the processed surface A is smaller than the surface roughness on the cast surface B. For example, the surface roughness of the cast surface B is Ra 1.5 or more and 1.8 or less, and the surface roughness of the processed surface A is Ra 0.5 or more and 0.6 or less.

Further, in this embodiment, the outer peripheral surface of the stepped portion 414a is inclined such that the diameter decreases toward the upper side in the axial direction (see FIG. 6), but the outer peripheral surface of the stepped portion 414a may be formed upright with respect to the upper surface of the bottom wall portion 411.

The processed surface A is a cutting mark left when a thick portion 414b protruding in the radial direction from a part of the outer peripheral surface of the stepped portion 414a is cut in the method of manufacturing the base plate 41 described later (see FIG. 10). The cutting mark 418 is also a part of the cutting mark left when the thick portion 414b is cut. In this embodiment, the thick portion 414b is formed to protrude in the radial direction from a part of the outer peripheral surface of the stepped portion 414a and straddle the upper surface of the stepped portion 414a when the cylindrical wall portion 414 is cast. By forming the thick portion 414b, a portion of the stepped portion 414a becomes thicker in the radial and axial directions. Shrinkage cavities are generated when molten metal cools, solidifies, and shrinks during casting. At this time, in the stepped portion 414a, a difference in solidification time occurs between the thick portion 414b and the area where the thick portion 414b is not formed.

Specifically, the solidification time of the thick portion 414b is longer than the solidification time of the area where the thick portion 414b is not formed, and shrinkage cavities are likely to be generated in the thick portion 414b. Accordingly, shrinkage cavities tend to concentrate on the side of the thick portion 414b of the cylindrical wall portion 414. Therefore, by generating shrinkage cavities on the side of the thick portion 414b of the cylindrical wall portion 414, the shrinkage cavities can be generated away from the shaft through hole 415. Accordingly, it is possible to prevent shrinkage cavities from being exposed from the shaft through hole 415. Further, it is possible to reduce the possibility that shrinkage cavities remain in the cylindrical wall portion 414 after cutting the thick portion 414b. Therefore, the inclination of the shaft 21 due to shrinkage cavities can be suppressed, and the gas filled inside the housing 40 can be suppressed from leaking to the outside via the cylindrical wall portion 414.

Further, the upper end of the processed surface A is located at the upper end of the outer peripheral surface of the stepped portion 414a and the lower end of the processed surface A is located at the lower end of the outer peripheral surface of the stepped portion 414a. Accordingly, the processed surface A is formed to be wide in the axial direction on the outer peripheral surface of the stepped portion 414a. Therefore, when casting the cylindrical wall portion 414, the area occupied by the thick portion 414b in the stepped portion 414a can be increased, and shrinkage cavities can be generated further away from the shaft through hole 415.

Further, the central angle θ formed by both circumferential ends at the upper end of the processed surface A is 90° or more and 110° or less when viewed from the axial direction (see FIG. 5). When the central angle θ is smaller than 90°, the area occupied by the thick portion 414b in the stepped portion 414a becomes smaller. As a result, shrinkage cavities are shifted toward the thick portion 414b of the cylindrical wall portion 414 and are less likely to be generated, and shrinkage cavities are further away from the shaft through hole 415 and less likely to be generated. On the other hand, when the central angle θ is larger than 110°, the area occupied by the thick portion 414b in the stepped portion 414a increases, but shrinkage cavities shift toward the thick portion 414b of the cylindrical wall portion 414 and become less likely to be generated. Further, shrinkage cavities tend to increase in size. As a result, shrinkage cavities remain in the cylindrical wall portion 414 after cutting the thick portion 414b, and the shrinkage cavities are likely to be exposed from the shaft through hole 415.

Further, a straight line L passing through both circumferential ends at the upper end of the processed surface A is located radially outward from the inner peripheral surface of the cylindrical wall portion 414 when viewed from the axial direction. Accordingly, shrinkage cavities tend to be generated on the side of the thick portion 414b of the cylindrical wall portion 414 and shrinkage cavities can be generated away from the shaft through hole 415. Accordingly, it is possible to prevent shrinkage cavities from being exposed from the shaft through hole 415.

The central angle θ may be larger than 110°, and the straight line L may be located radially inward from the inner peripheral surface of the cylindrical wall portion 414. Further, the thick portion 414b may protrude in the radial direction from the entire circumference of the outer peripheral surface of the stepped portion 414a. At this time, shrinkage cavities are more likely to shift to the outside of the thick portion 414b in the radial direction by increasing the thickness of the thick portion 414b in the radial direction. Accordingly, shrinkage cavities can be generated away from the shaft through hole 415.

Further, the upper surface of the stepped portion 414a has a precision processed surface C. The precision processed surface C is an area that is cut with higher precision than the processed surface A in the shaping step of the method of manufacturing the base plate 41, which will be described later. The precision processed surface C can be infiltrated with an impregnating agent to be described later. The surface roughness of the precision processed surface C is different from the surface roughness of the processed surface A and the cast surface B.

Further, in this embodiment, the upper end of the thick portion 414b that spans the upper surface of the stepped portion 414a is located below the upper end of the cylindrical wall portion 414 in the axial direction. The thick portion 414b spanning the upper surface of the stepped portion 414a is cut together with the stepped portion 414a protruding from the outer peripheral surface. By forming the thick portion 414b spanning the upper surface of the stepped portion 414a, shrinkage cavities can be generated away from the shaft through hole 415 in the axial direction. Cutting marks on the thick portion 414b extending over the upper surface of the stepped portion 414a disappear when the precision processed surface C is formed.

Further, since the cylindrical wall portion 414 has higher rigidity due to the stepped portion 414a, it is possible to reduce a decrease in press-fitting strength of the shaft 21 press-fitted into the cylindrical wall portion 414. Further, since it is possible to suppress the deformation of the cylindrical wall portion 414, it is possible to suppress the shaft 21 from being inclined with respect to the rotation axis J. Further, the cylindrical wall portion 414 is reinforced uniformly in the circumferential direction by cutting the thick portion 414b after casting to make the radial thickness of the stepped portion 414a uniform in the circumferential direction. Accordingly, it is possible to further suppress the shaft 21 from being inclined with respect to the rotation axis J. Thus, it is possible to suppress the shaft 21 from being inclined with respect to the axial direction while reducing the shrinkage cavities remaining in the cylindrical wall portion 414 after cutting. Accordingly, the spindle motor 2 is stably supported by the bottom wall portion 411 via the cylindrical wall portion 414.

A plurality of wire through holes 417 is arranged in the circumferential direction to penetrate the stepped portion 414a and the bottom wall portion 411 in the axial direction and wires (not shown) are inserted therethrough. The wires extend from the stator 12 and are pulled out to the outside of the housing 40. At least one wire through hole 417 faces the processed surface A with the rotation axis J interposed therebetween in the radial direction. In this embodiment, the wire through hole 417 is formed at three positions in the circumferential direction and two wire through holes 417 face the processed surface A with the rotation axis J interposed therebetween in the radial direction. The through holes are not limited to those in the embodiment, and a single number of through holes may be provided as required.

Accordingly, when casting the cylindrical wall portion 414, shrinkage cavities are likely to be generated in the thick portion 414b located on the opposite side in the radial direction from the wire through hole 417 across the rotation axis J. Therefore, shrinkage cavities can be generated at a distance from the wire through hole 417 in the radial direction. Accordingly, it is possible to suppress the leakage of the gas filled inside the housing 40 from around the wire through hole 417 to the outside.

Further, the bottom wall portion 411 includes a recess 411a. The recess 411a is formed by recessing the lower surface of the bottom wall portion 411 upward in the axial direction, and a plurality of wire through holes 417 is arranged therein.

Accordingly, since the stepped portion 414a is thinned in the axial direction above the recess 411a, shrinkage cavities are less likely to be generated. Accordingly, the leakage of the gas filled inside the housing 40 from around the wire through hole 417 to the outside can be further suppressed. The recess 411a is filled with mold resin. Accordingly, deterioration of the airtightness of the base plate 41 through the wire through hole 417 can be reduced.

Figure 7:
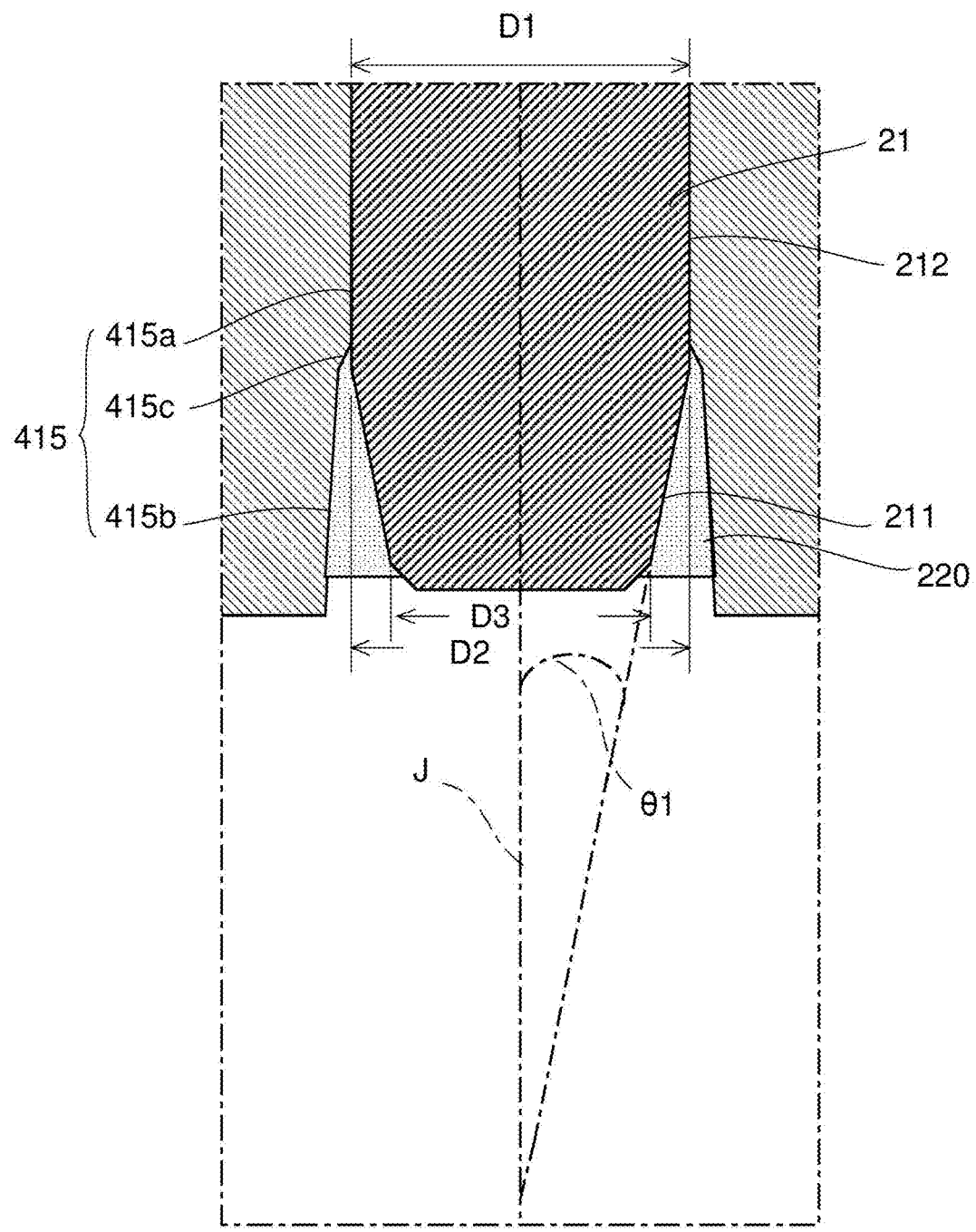
FIG. 7 is an enlarged longitudinal sectional view of a part of the base plate according to the embodiment of the disclosure.

FIG. 7 is an enlarged longitudinal sectional view of the lower end of the shaft 21 of the base plate 41. In this embodiment, the core back 121a is press-fitted into the cylindrical wall portion 414 and is fixed to the base plate 41 (see FIG. 1). Further, after the core back 121a is fixed to the base plate 41, the shaft 21 is inserted into the shaft through hole 415. When the core back 121a is press-fitted into the outer peripheral portion of the cylindrical wall portion 414, a force that reduces the diameter of the shaft through hole 415 acts on the base plate 41. Therefore, after the core back 121a is fixed to the base plate 41, the press-fitting load of the shaft 21 into the shaft through hole 415 increases.

Therefore, there is a risk that the shaft 21 may be inclined or deformed with respect to the rotation axis J during press-fitting. If the shaft 21 is inclined with respect to the rotation axis J, there is a risk that the distance between the head 31 and the disk 50 will shift, resulting in reading/writing errors. Further, since the shaft 21 itself is press-fitted at an angle, galling may occur between the lower end of the shaft 21 and the inner surface of the shaft through hole 415, which may reduce the press-fitting strength. Furthermore, particles may be generated and the disk drive device 1 may be contaminated.

In contrast, in this embodiment, the shaft 21 includes a shaft inclined portion 211 and a shaft contact portion 212. The shaft inclined portion 211 is disposed at the lower end of the shaft 21 and has an outer diameter that decreases toward the lower side in the axial direction.

When the shaft 21 is press-fitted into the shaft through hole 415, the shaft inclined portion 211 comes into contact with the upper inner peripheral edge of the peripheral wall surrounding the shaft through hole 415 (in this embodiment, the upper inner peripheral edge of the cylindrical wall portion 414). Accordingly, the shaft 21 is guided inside the shaft through hole 415 and the shaft 21 is easily press-fitted into the shaft through hole 415 without inclining the shaft with respect to the rotation axis J. Therefore, the press-fitting load of the shaft 21 can be reduced while suppressing galling between the shaft 21 and the shaft through hole 415. Thereby, the shaft 21 can be mounted with high accuracy along the rotation axis.

Further, when the adhesive 220 is applied to the inner peripheral surface of the shaft through hole 415 and the shaft 21 is press-fitted, the adhesive 220 acts as a lubricant. Accordingly, the press-fitting load of the shaft 21 can be further reduced. When the shaft is press-fitted, the adhesive 220 accumulates in the gap between the inner peripheral surface of the shaft through hole 415 and the shaft inclined portion 211. That is, the adhesive 220 is disposed between the shaft inclined portion 211 and the inner peripheral surface of the shaft through hole 415. Accordingly, the shaft 21 is firmly fixed inside the shaft through hole 415 via the adhesive 220.

Further, the gap between the inner peripheral surface of the shaft through hole 415 and the shaft inclined portion 211 is formed to be narrow in the radial direction toward the upper side in the axial direction. As a result, the adhesive 220 is sucked up by capillary phenomenon to the press-fit portion where the inner peripheral surface of the shaft through hole 415 and the shaft 21 come into contact. Accordingly, the shaft 21 is more firmly fixed inside the shaft through hole 415 via the adhesive 220.

At this time, air bubbles contained in the adhesive 220 that accumulate in the gap between the inner peripheral surface of the shaft through hole 415 and the shaft inclined portion 211 are not absorbed into the press-fitting portion. Further, air bubbles mixed in the adhesive 220 in the press-fitting portion are pushed out by the adhesive 220 sucked up by the press-fitting portion and are discharged during press-fitting. Accordingly, the shaft 21 is more firmly fixed inside the shaft through hole 415 via the adhesive 220.

Further, the shaft 21 is heated due to an increase in temperature due to the drive of the spindle motor 2 or an increase in the temperature of the environment in which the spindle motor 2 is used. At this time, there is a possibility that air bubbles mixed into the adhesive 220 in the press-fitting portion will thermally expand. In this embodiment, since air bubbles mixed in the adhesive 220 at the press-fitting portion are discharged, it is possible to prevent cracks from occurring in the adhesive 220. Accordingly, the airtightness of the base plate 41 can be prevented from being deteriorated through the shaft through hole 415.

In the cross section including the rotation axis J, the shaft inclined portion 211 has an inclination angle $\theta 1$ of 5° or more and 10° or less with respect to the rotation axis J. When the inclination angle $\theta 1$ is smaller than 5°, the gap between the inner peripheral surface of the shaft through hole 415 and the shaft inclined portion 211 narrows in the radial direction, and the amount of the adhesive 220 filled in the gap decreases. As a result, the adhesive strength between the inner peripheral surface of the shaft through hole 415 and the shaft 21 is reduced.

Further, when the inclination angle $\theta 1$ is 10° or less, the adhesive 220 accumulated between the inner peripheral surface of the shaft through hole 415 and the shaft inclined portion 211 is likely to be sucked up toward the press-fitting portion due to capillary phenomenon. Accordingly, air bubbles mixed in the adhesive 220 in the press-fitting portion are easily discharged. Therefore, the shaft 21 is more firmly fixed inside the shaft through hole 415 via the adhesive 220.

The shaft contact portion 212 is disposed above the shaft inclined portion 211 in the axial direction and contacts the inner peripheral surface of the shaft through hole 415. The axial length of the shaft contact portion 212 is longer than the axial length of the shaft inclined portion 211. Accordingly, the press-fitted shaft 21 is more firmly fixed inside the shaft through hole 415.

The shaft through hole 415 includes a columnar portion 415a, an enlarged hole portion 415b, and a connecting portion 415c. The columnar portion 415a extends parallel to the rotation axis J and comes into contact with the outer peripheral surface of the shaft 21 (shaft contact portion 212).

Before the shaft 21 is inserted into the shaft through hole 415, the inner diameter D1 of the columnar portion 415a (minimum inner diameter of the shaft through hole 415) is smaller than the outer diameter D2 of the upper end of the shaft inclined portion 211, and larger than the outer diameter D3 of the lower end of the shaft inclined portion 211. Accordingly, the shaft 21 is tightly fitted above the upper end of the shaft inclined portion 211 in the axial direction. Therefore, the press-fitted shaft 21 is more firmly fixed inside the shaft through hole 415.

The enlarged hole portion 415b is disposed below the columnar portion 415a in the axial direction, and has an inner diameter larger than the inner diameter of the columnar portion 415a. Further, the upper end of the enlarged hole portion 415b is located above the upper end of the shaft inclined portion 211 in the axial direction. The gap between the enlarged hole portion 415b and the shaft inclined portion 211 widens and the amount of the adhesive 220 disposed in the gap increases. Accordingly, the shaft 21 is more firmly fixed inside the shaft through hole 415.

Further, in this embodiment, the enlarged hole portion 415b has an inner diameter that becomes larger toward the lower side in the axial direction. Accordingly, the adhesive 220 accumulated between the enlarged hole portion 415b and the shaft inclined portion 211 is easily sucked up by the press-fitting portion side due to capillary phenomenon. Further, air bubbles mixed into the adhesive 220 in the press-fitting portion are easily discharged.

The connecting portion 415c connects the columnar portion 415a and the enlarged hole portion 415b. The inner diameter of the connecting portion 415c increases toward the lower side in the axial direction. Accordingly, the adhesive 220 accumulated between the enlarged hole portion 415b and the shaft inclined portion 211 is easily sucked up by the press-fitting portion side via the connecting portion 415c due to capillary phenomenon. Further, air bubbles mixed into the adhesive 220 in the press-fitting portion are easily discharged.

Figure 8:
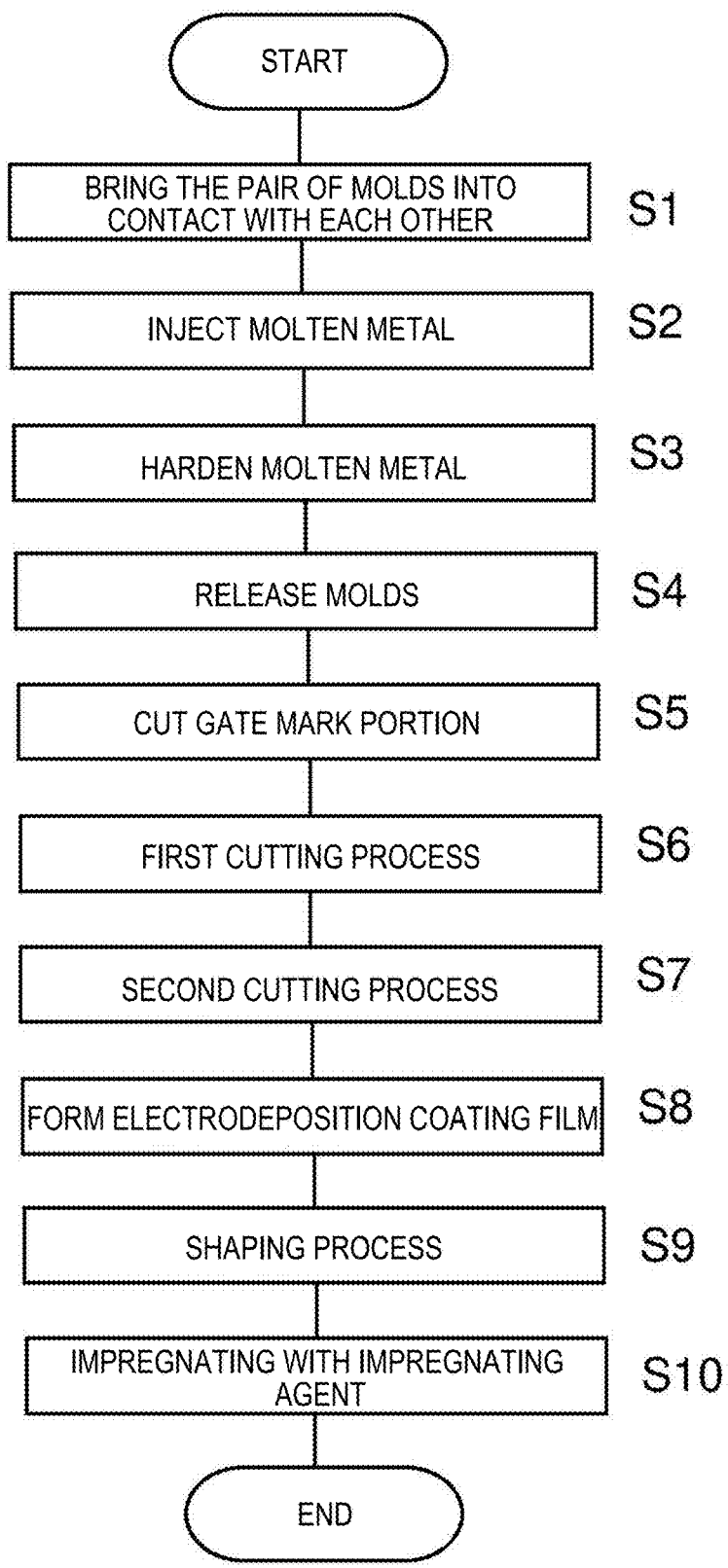
FIG. 8 is a flowchart showing a manufacturing step for the base plate according to the embodiment of the disclosure.

FIG. 8 is a flowchart showing a manufacturing step for the base plate 41. FIGS. 9 to 15 are explanatory diagrams illustrating the manufacturing step for the base plate.

Figure 9:
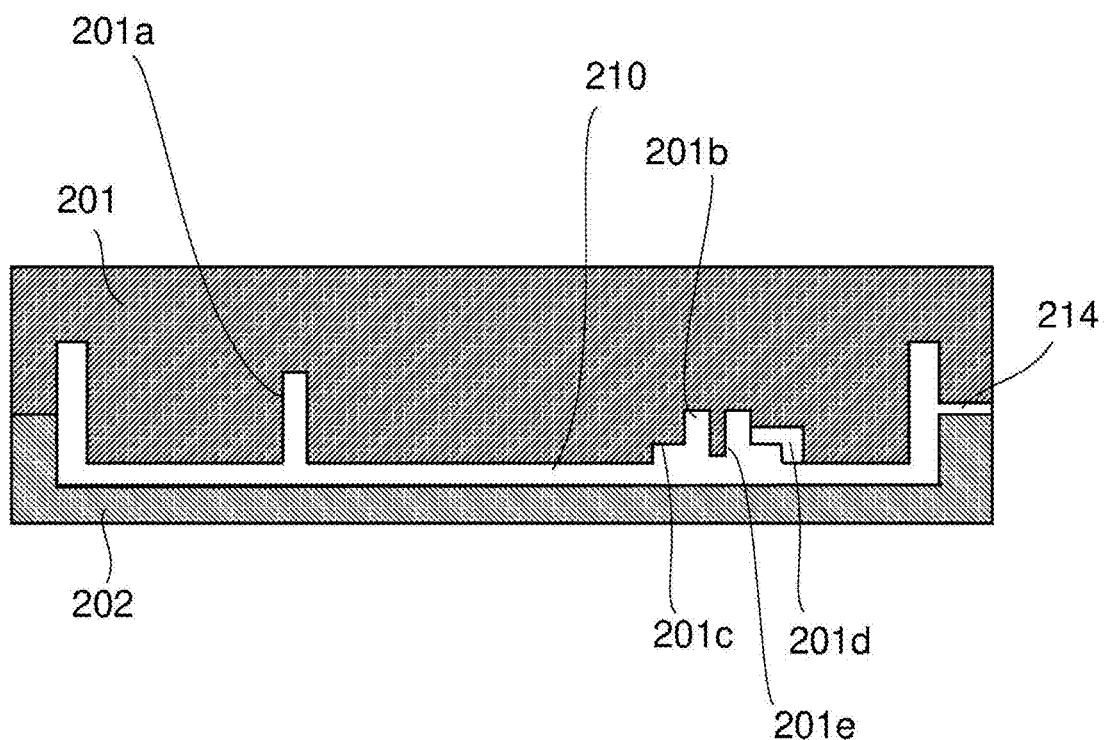
FIG. 9 is an explanatory diagram illustrating the manufacturing step for the base plate according to the embodiment of the disclosure.

In step S1, as shown in FIG. 9, a cavity 210 is formed between the molds 201 and 202 by bringing the peripheral edge of the mold 202 and the peripheral edge of the mold 201 into contact in the vertical direction. The cavity 210 has a shape corresponding to the shape of the base plate 41.

Further, the cavity 210 communicates with a gate 214 extending along opposing surfaces of the molds 201 and 202. The outer end of the gate 214 opens to the outside of the molds 201 and 202.

Further, an air vent channel (not shown) for venting the air in the cavity 210 is provided on the opposing surfaces of the molds 201 and 202 apart from the gate 214. The outer ends of the air vent channels are open to the outside of the molds 201 and 202.

The mold 201 includes a first recess 201a and a second recess 201b. The first recess 201a is formed by recessing the lower surface of the mold 201 upward in the axial direction along the swing axis H. The inside of the first recess 201a communicates with the cavity 210. Molten metal flows into the first recess 201a to form the pivot post 413.

The second recess 201b is formed by recessing the lower surface of the mold 201 upward in the axial direction along the rotation axis J. The inside of the second recess 201b communicates with the cavity 210. A protrusion 201e that protrudes downward is formed on the top surface of the second recess 201b. Further, the second recess 201b is provided with an enlarged diameter portion 201c. The lower end of the inner peripheral surface of the second recess 201b is provided with the enlarged diameter portion 201c. The enlarged diameter portion 201c has a larger diameter than the upper end of the inner peripheral surface of the second recess 201b.

The enlarged diameter portion 201c includes an enlarged recess 201d. The enlarged recess 201d is disposed over a part of the top surface and a part of the inner peripheral surface of the enlarged diameter portion 201c and is recessed outward from the top surface and inner peripheral surface of the enlarged diameter portion 201c. Molten metal flows into the first recess 201a to form the cylindrical wall portion 414. In the cylindrical wall portion 414, a recess 414f is formed at a position where the protrusion 201e is disposed (see FIG. 11). The recess 414f is formed to be recessed downward in the axial direction from the upper surface of the cylindrical wall portion 414. Molten metal flows into the enlarged diameter portion 201c to form the stepped portion 414a. Molten metal flows into the enlarged recess 201d to form the thick portion 414b.

Figure 10:
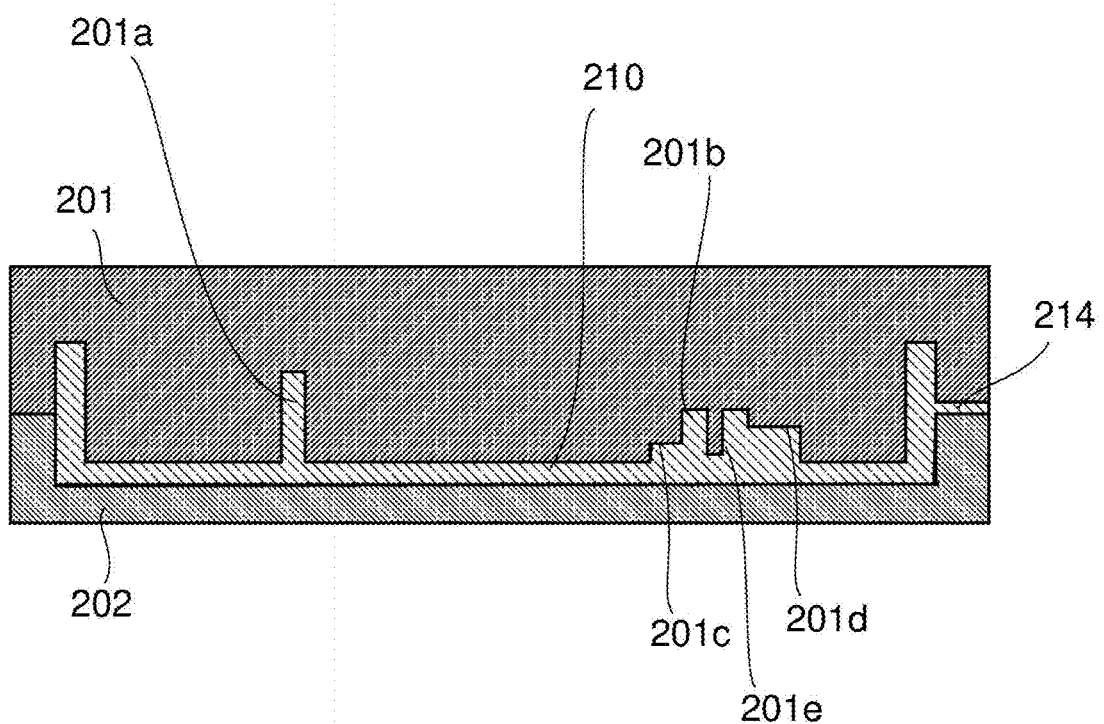
FIG. 10 is an explanatory diagram illustrating the manufacturing step for the base plate according to the embodiment of the disclosure.

In step S2, as shown in FIG. 10, molten metal is injected into the cavity 210 via the gate 214. Molten metal is, for example, molten aluminum alloy. When molten metal is injected into the cavity 210, air inside the cavity 210 or gas generated from the molten metal is pushed out to the outside of the mold 201 and the mold 202 from the air vent channel. Accordingly, molten metal spreads in the entire cavity 210.

In step S3, molten metal spreads in the cavity 210 and cools and hardens. Accordingly, the base plate 41 is formed inside the cavity 210. A chill layer (not shown) is formed on the surface of the base plate 41. When the molten metal hardens, the chill layer is formed in a place where the molten metal comes into contact with the molds 201 and 202 and hardens quickly. The chill layer, where molten metal hardens faster than other parts, has fewer impurities and higher metal density. Further, when the molten metal hardens, shrinkage cavities are generated when the thick portion 414b solidifies and shrinks.

Figure 11:
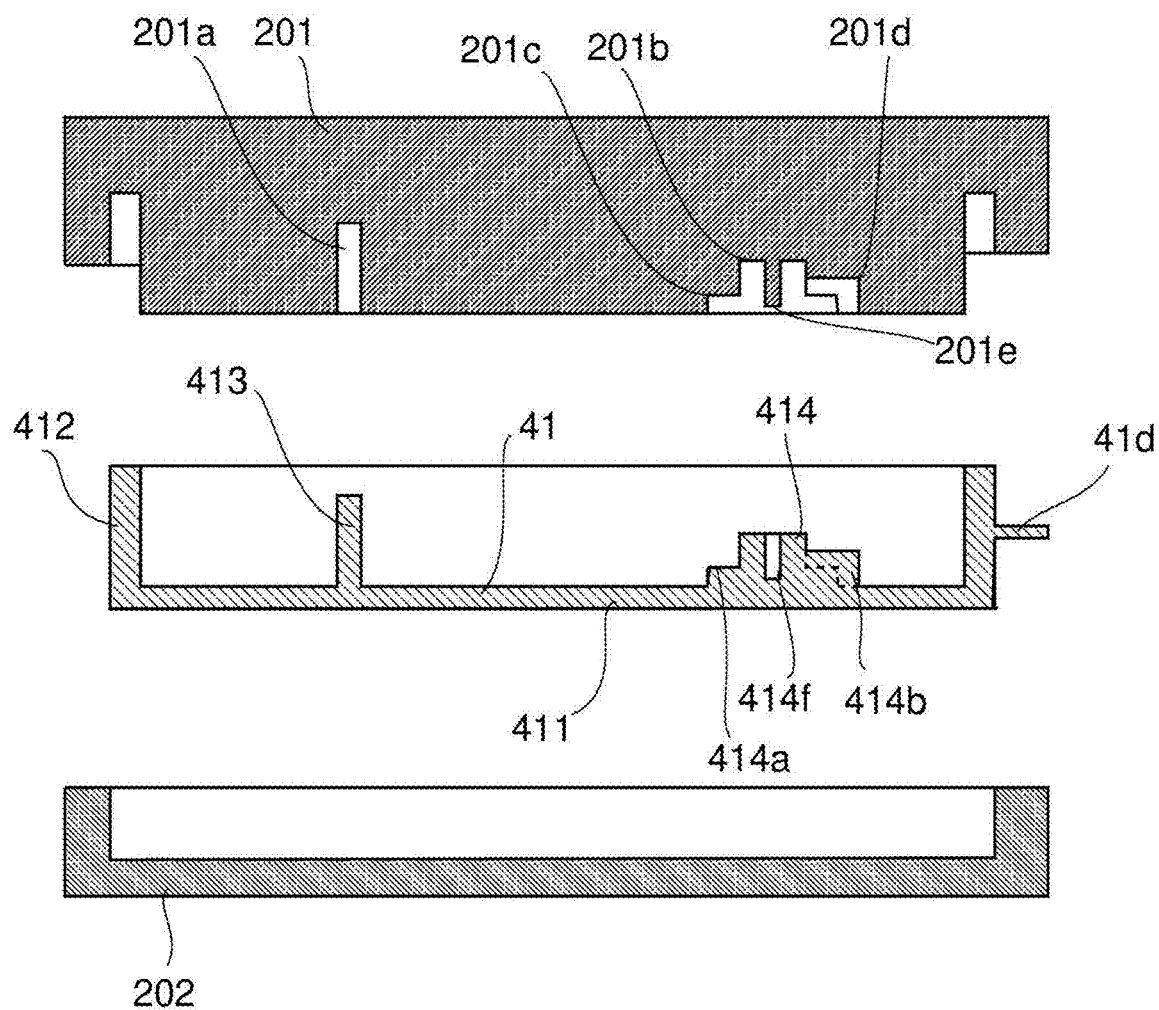
FIG. 11 is an explanatory diagram illustrating the manufacturing step for the base plate according to the embodiment of the disclosure.

In step S4, as shown in FIG. 11, the base plate 41 is released from the pair of molds 201 and 202. At this time, the peripheral wall portion 412 has a gate mark portion 41d protruding from the outer surface. The gate mark portion 41d is formed by hardening the molten metal accumulated in the gate 214 and the air vent channel (not shown).

Figure 12:
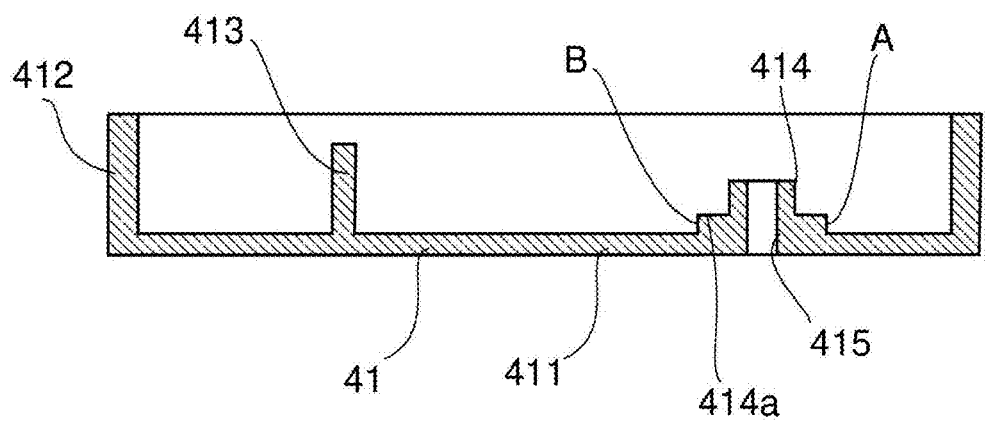
FIG. 12 is an explanatory diagram illustrating the manufacturing step for the base plate according to the embodiment of the disclosure.

In step S5, as shown in FIG. 12, the gate mark portion 41d is cut. A mark G obtained by cutting the gate mark portion 41d (see FIG. 13) remains slightly protruding from the outer surface of the peripheral wall portion 412.

Figure 13:
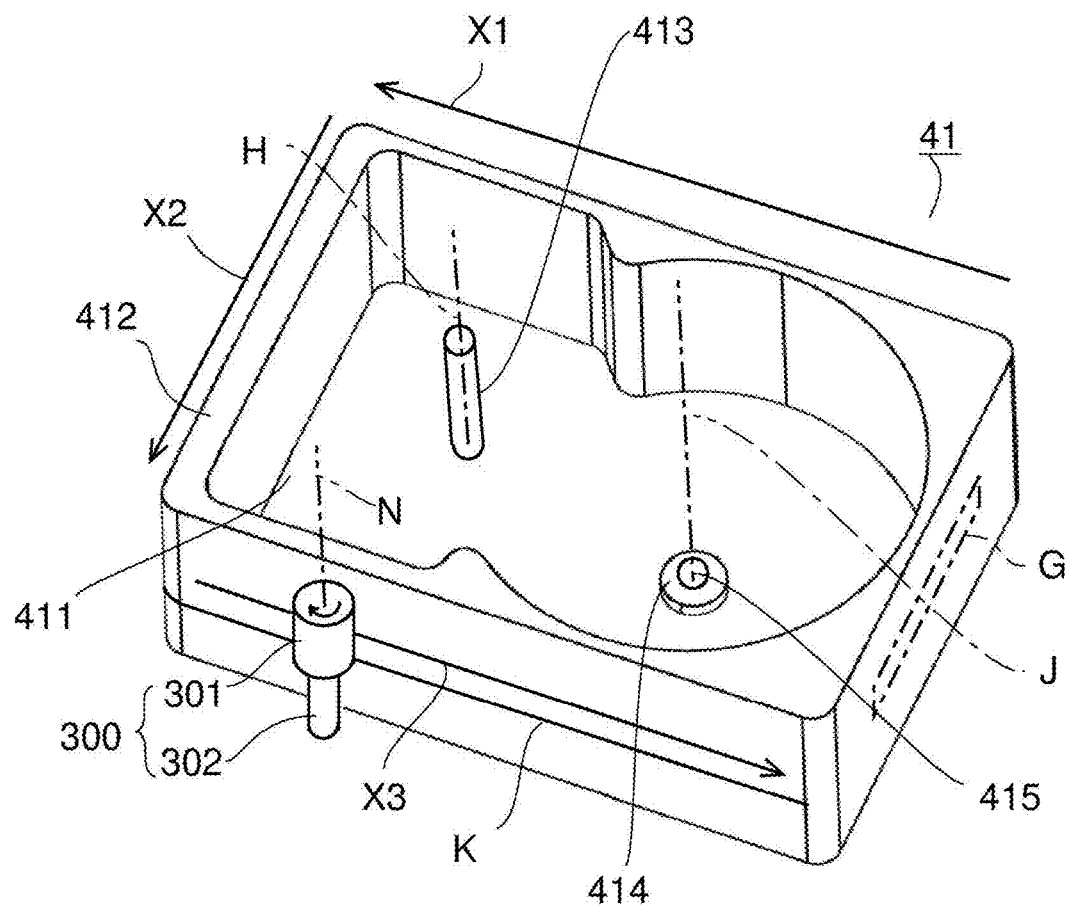
FIG. 13 is an explanatory diagram illustrating the manufacturing step for the base plate according to the embodiment of the disclosure.

In step S6, as shown in FIG. 13, the outer peripheral surface of the peripheral wall portion 412 is cut using a cutting device 300 (first cutting step). The cutting device 300 includes a cylindrical cutting section 301 and a drive section 302 that rotates the cutting section 301. The cutting section 301 rotates around a central axis N extending parallel to the rotation axis J. In this embodiment, the axial length of the cutting section 301 is shorter than the axial length of the peripheral wall portion 412. Further, the cutting section 301 is rotatable clockwise or counterclockwise when viewed from above.

The cutting section 301 extends in the circumferential direction on the outer peripheral surface of the peripheral wall portion 412. A parting line portion K is disposed in the axial direction. The parting line portion K is formed along the opposing surfaces of the mold 201 and the mold 202 that face each other in the axial direction. When the base plate 41 is released from the pair of molds 201 and 202 (see FIG. 11), burrs are generated along the parting line portion K in the peripheral wall portion 412. Therefore, burrs can be removed by cutting the outer peripheral surface of the peripheral wall portion 412 along the parting line portion K.

In a system in which a disk drive device 18 (hard disk drive) such as a server is mounted, if the peripheral wall portion 412 is removed too much, a gap may be created around the base plate 41 within the system. Accordingly, there is a possibility that the vibration in the system increases. In this embodiment, the axial length of the cutting section 301 is shorter than the axial length of the peripheral wall portion 412. Accordingly, excessive cutting of the peripheral wall portion 412 can be prevented. After cutting by the cutting section 301, a cutting surface (not shown) is formed on the outer peripheral surface of the peripheral wall portion 412. Cutting marks (not shown) extending in a band shape along the circumferential direction are formed on the cutting surface. The cutting marks are formed with an axial width of 4 mm to 8 mm.

The cutting section 30 cuts three surfaces of the outer peripheral surface of the rectangular parallelepiped base plate 41 except for one surface where the mark G of the gate mark 41d remains. For example, the cutting section 301 cuts the outer peripheral surface of the peripheral wall portion 412 in the order of arrow X1, arrow X2, and arrow X3. The directions of arrow X1, arrow X2, and arrow X3 may be reversed, and the outer peripheral surface of the peripheral wall portion 412 may be cut in the order of arrow X3, arrow X2, and arrow X1.

In step S7, the thick portion 414b is cut (second cutting step). More specifically, in the second cutting step, the thick portion 414b is cut to make the radial thickness of the stepped portion 414a uniform in the circumferential direction. Further, the thick portion 414b spanning the upper surface of the stepped portion 414a is cut to make the axial thickness of the stepped portion 414a uniform in the circumferential direction. At this time, the processed surface A is formed in a part of the outer peripheral surface of the stepped portion 414a. In the processed surface A, the plurality of cutting marks 418 centered around the shaft through hole 415 and extending linearly in the circumferential direction is formed in a line in the radial direction (see FIG. 5).

A chill layer (not shown) is formed on the surface of the base plate 41 released from the molds 201 and 202. When the molten metal hardens, the chill layer is formed in a place where the molten metal comes into contact with the molds 201 and 202 and hardens quickly. The chill layer, where molten metal hardens faster than other parts, has fewer impurities and higher metal density. In this embodiment, no chill layer remains on the cut surface A, but the chill layer remains on the uncut cast surface B. Further, the cutting device used in the second cutting step in step S7 is different from the cutting device 300 used in the first cutting step in step S6. The second cutting step in step S7 is a cutting step in an area that requires more precision than the first cutting step in step S6. Therefore, the surface roughness of the processed surface A is different from the surface roughness of the cut surface (not shown) formed by the first cutting step in step S6.

Further, in step S7, the recess 414*f* is cut in the axial direction to penetrate the bottom wall portion 411 in the axial direction. Accordingly, the shaft through hole 415 is formed by a cutting step. At this time, shrinkage cavities are not exposed on the peripheral surface of the shaft through hole 415.

Figure 14:
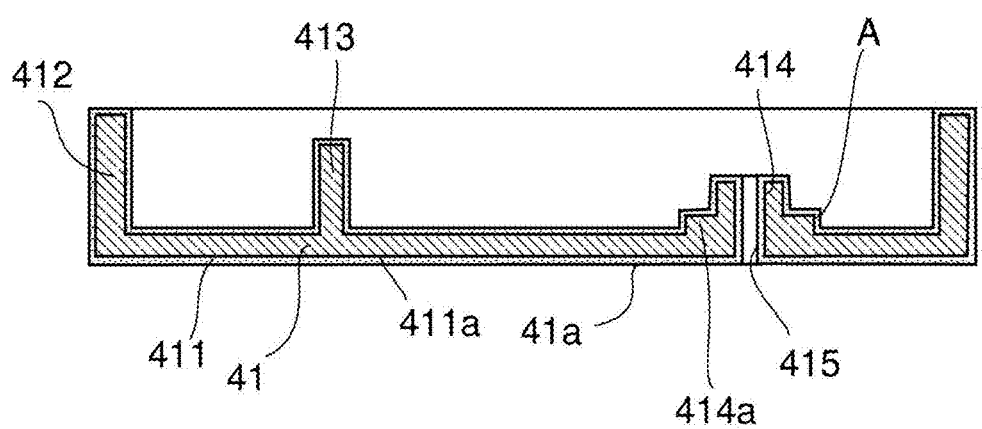
FIG. 14 is an explanatory diagram illustrating the manufacturing step for the base plate according to the embodiment of the disclosure.

In step S8, as shown in FIG. 14, the electrodeposition coating film 41*a* is formed on the surface of the base plate 41. The electrodeposition coating film 41*a* is formed by, for example, immersing the base plate 41 in an epoxy resin coating material and passing an electric current between the coating material and the base plate 41. As a result, the coating material adheres to the surface of the base plate 41 to form the electrodeposition coating film 41*a*. At this time, the outer surface of the processed surface A is also covered with the electrodeposition coating film 41*a*. By covering the base plate 41 with the electrodeposition coating film 41*a*, the insulation of the base plate 41 is improved and leakage of gas passing through the base plate 41 can be reduced.

Figure 15:
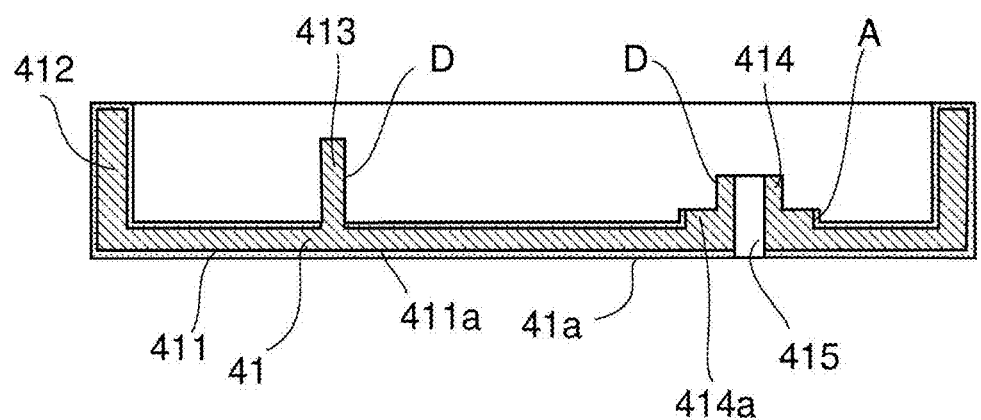
FIG. 15 is an explanatory diagram illustrating the manufacturing step for the base plate according to the embodiment of the disclosure.

In step S9, as shown in FIG. 15, areas of the surface of the base plate 41 that require precision are precisely processed and shaped by cutting. Specifically, the outer peripheral surface of the pivot post 413, the peripheral surfaces of the cylindrical wall portion 414 and the shaft through hole 415, the outer peripheral surface of the cylindrical wall portion 414, and the upper surface of the stepped portion 414*a* are shaped. Further, the wire through hole 417 is formed. At this time, the precision processed surface C is formed on the upper surface of the stepped portion 414*a* (see FIG. 3). When the peripheral surface of the shaft through hole 415 is molded, shrinkage cavities are not exposed on the peripheral surface of the shaft through hole 415. The outer peripheral surface including the processed surface A of the stepped portion 414*a* is not cut, but is covered with the electrodeposition coating film 41*a*.

At this time, the electrodeposition coating film 41*a* is also cut by cutting the surface of the base plate 41 and a non-coating area D not provided with the electrodeposition coating film 41*a* is formed. Further, the precision processed surface C is provided with the non-coating area D.

In step S9, the base plate 41 is immersed in an impregnating agent. Accordingly, the impregnating agent is infiltrated into the non-coating area D. At this time, the impregnating agent is also infiltrated into the precision processed surface C. For example, epoxy resin or acrylic resin is used as the impregnating agent. Accordingly, in the non-coating area D, minute cavities formed during casting are sealed with an impregnating agent. Accordingly, it is possible to further suppress the leakage of the gas filled inside the housing 40 to the outside via the cylindrical wall portion 414.

As described above, the method of manufacturing the cast base plate 41 that becomes a part of the housing 40 of the disk drive device 1 includes a casting step, a first cutting step, a second cutting step, an electrodeposition coating step, a shaping step, and an impregnation step in this order. In the casting step, the bottom wall portion 411 and the cylindrical wall portion 414 are integrally cast using a mold (steps S1 to S4). In the first cutting step, the outer peripheral surface of the peripheral wall portion 412 is cut to remove burrs (step S6). In the second cutting step (cutting step), a part of the cylindrical wall portion 414 is cut (step S7). In the electrodeposition coating step, the electrodeposition coating film 41*a* is formed on the surface of the base plate 41 (step S8). In the shaping step, an area of the surface of the base plate 41 that requires precision is precisely processed and shaped by cutting (step S9). In the impregnation step, the area exposed from the electrodeposition coating film 41*a* on the surface of the base plate 41 is impregnated with an impregnating agent (step S10).

Further, in the casting step, the cylindrical wall portion 414 is integrally formed with an annular stepped portion 414*a* that protrudes radially outward from the outer peripheral surface of the root portion. Further, the stepped portion 414*a* has the thick portion 414*b* that protrudes from at least a portion of the outer peripheral surface and is formed across the upper surface. Further, in the second cutting step (cutting step), the thick portion 414*b* is cut and the cut surface A is formed on at least a part of the outer peripheral surface of the stepped portion 414*a*.

In the casting step, a part of the stepped portion 414*a* becomes thick in the radial direction and the axial direction by forming the thick portion 414*b*. Accordingly, shrinkage cavities tend to be concentrated on the side of the thick portion 414*b* of the cylindrical wall portion 414. Thus, shrinkage cavities can be generated away from the shaft through hole 415 by generating shrinkage cavities on the side of the thick portion 414*b* of the cylindrical wall portion 414. Accordingly, it is possible to prevent shrinkage cavities from being exposed from the shaft through hole 415.

Further, in the second cutting step (cutting step), the thick portion 414*b* is cut and the processed surface A is formed on the outer peripheral surface of the stepped portion 414*a*. At this time, the cylindrical wall portion 414 is uniformly reinforced in the circumferential direction by making the radial thickness of the stepped portion 414*a* uniform in the circumferential direction. Accordingly, it is possible to further suppress the shaft 21 from being inclined with respect to the rotation axis J. Therefore, it is possible to suppress the shaft 21 from being inclined in the axial direction while reducing the possibility that shrinkage cavities remain in the cylindrical wall portion 414 after cutting.

The above embodiments are merely illustrative of the present disclosure. The configuration of the embodiment may be modified as appropriate without departing from the technical idea of the present disclosure. Furthermore, the embodiments may be implemented in combination to the extent possible. For example, in this embodiment, the pivot post 413 is cast integrally with the bottom wall portion 411, but the pivot post 413 may be formed as a separate member from the base plate 41.

The pivot post 413 is made of, for example, a metal such as stainless steel, which has higher rigidity than an aluminum alloy, and has higher rigidity than the metal forming the base plate 41. Since the pivot post 413 is formed as a separate member from the base plate 41, it is possible to improve the rigidity of the pivot post 413 and to prevent the generation of shrinkage cavities in the pivot post 413.

Therefore, it is possible to suppress the gas filled inside the housing 40 from leaking to the outside via the pivot post 413.

Further, in this embodiment, the upper end of the thick portion 414b that spans the upper surface of the stepped portion 414a is located axially lower than the upper end of the cylindrical wall portion 414, but may be located axially higher than the upper end of the cylindrical wall portion 414. Accordingly, shrinkage cavities can be generated further away from the shaft through hole 415.

As described above, the base plate (41) according to an aspect of the disclosure is a base plate that becomes a part of the housing (40) of the disk drive device (1) and is made of a metal die-cast member, including: the bottom wall portion (411) that extends perpendicularly to the rotation axis (J) of the disk extending in the vertical direction; and the cylindrical wall portion (414) that protrudes upward from the upper surface of the bottom wall portion along the rotation axis and has the shaft through hole (415) through which the shaft is inserted, wherein the cylindrical wall portion has the annular stepped portion (414a) that protrudes radially outward from an outer peripheral surface of a root portion, and wherein the processed surface (A) is formed on at least a part of the outer peripheral surface of the stepped portion (first configuration).

In the first configuration, the cast surface (B) may be provided circumferentially adjacent to the processed surface in the outer peripheral surface of the stepped portion, and the surface roughness of the processed surface may be smaller than the surface roughness of the cast surface (second configuration).

In the first or third configuration, the upper end of the processed surface may be located at the upper end of the outer peripheral surface of the stepped portion, and the lower end of the processed surface may be located at the lower end of the outer peripheral surface of the stepped portion (third configuration).

In any one of the first to third configurations, the central angle (θ) formed by both circumferential ends of the upper end of the processed surface may be 90° or more and 110° or less when viewed from the axial direction (fourth configuration).

In any one of the first to fourth configurations, a straight line passing through both circumferential ends at the upper end of the processed surface may be located radially outward from the inner peripheral surface of the cylindrical wall portion when viewed from the axial direction (fifth configuration).

In any one of the first to fifth configurations, the base plate may further include a plurality of wire through holes (417) which is arranged in the circumferential direction to penetrate the stepped portion and the bottom wall portion in the axial direction and through which wires connected to a motor are inserted, and at least one wire through hole may face the processed surface with the rotation axis interposed therebetween in the radial direction (sixth configuration).

In the sixth configuration, the recess (411a) may be formed by recessing the lower surface of the bottom wall portion upward in the axial direction and the plurality of wire through holes may be arranged therein (seventh configuration).

The spindle motor (2) according to an aspect of the disclosure includes: the base plate (41) according to any one of the first to seventh configurations; the shaft that extends along the rotation axis and has a lower end inserted through the shaft through hole; the annular stator core that is disposed on an upper surface of the base plate and surrounds the shaft; the rotor (22) that rotates about the rotation axis; and the bearing unit (13) that supports the rotor to be rotatable about the shaft as the rotation axis, wherein the shaft may have the shaft inclined portion (211) which is disposed at the lower end of the shaft and has an outer diameter that decreases toward the lower side in the axial direction (eighth configuration).

In the eighth configuration, the minimum inner diameter (D1) of the shaft through hole may be smaller than the outer diameter (D2) of the upper end of the shaft inclined portion and may be larger than the outer diameter (D3) of the lower end of the shaft inclined portion before the shaft is inserted through the shaft through hole (ninth configuration).

In the eighth or ninth configuration, the shaft may have the shaft contact portion that is disposed above the shaft inclined portion in the axial direction and contacts the inner peripheral surface of the shaft through hole, and the axial length of the shaft contact portion may be longer than the axial length of the shaft inclined portion (tenth configuration).

In any one of the eighth to tenth configurations, in a cross section including the rotation axis, the shaft inclined portion may have an inclination angle of 10° or less with respect to the rotation axis (eleventh configuration).

In any one of eighth to eleventh configurations, in the cross section including the rotation axis, the shaft inclined portion may have an inclination angle of 5° or more with respect to the rotation axis (twelfth configuration).

In any one of eighth to twelfth configurations, an adhesive may be disposed between the shaft inclined portion and the inner peripheral surface of the shaft through hole (thirteenth configuration).

In any one of eighth to thirteenth configurations, the shaft through hole may include the columnar portion (415a) that extends parallel to the rotation axis and contacts an outer peripheral surface of the shaft and the enlarged hole portion (415b) that is disposed on the lower side of the columnar portion in the axial direction and has an inner diameter larger than an inner diameter of the columnar portion, and the upper end of the enlarged hole portion may be located above the upper end of the shaft inclined portion in the axial direction (fourteenth configuration).

In any one of eighth to fourteenth configurations, the inner diameter of the enlarged hole portion may increase toward the lower side in the axial direction (fifteenth configuration).

In any one of eighth to fifteenth configurations, the shaft through hole may have a connecting portion that connects the columnar portion and the enlarged hole portion, and the inner diameter of the connecting portion may increase toward the lower side in the axial direction (sixteenth configuration).

The disk drive device (1) according to an aspect of the disclosure may include: the spindle motor (2) of any one of the eighth to sixteenth configurations, the disk (50) which rotates about the rotation axis by the spindle motor; and the head (31) which reads and writes information from and to the disk (seventeenth configuration).

In the seventeenth configuration, the inside of the housing may be filled with a gas having a lower density than air (eighteenth configuration).

The base plate manufacturing method according to an aspect of the disclosure is a method of manufacturing the base plate (41) as a part of the housing (40) of the disk drive device (1), including: a casting step of integrally casting the bottom wall portion (411) extending perpendicularly to the rotation axis (J) of the disk (50) extending vertically and having a rectangular shape when viewed from the axial direction and the cylindrical wall portion (414) protruding upward from the upper surface of the bottom wall portion along the rotation axis and disposing the shaft (21) therein using a mold; and a cutting step (second cutting step) of cutting a part of the cylindrical wall portion, wherein in the casting step, the cylindrical wall portion may be integrally formed with the annular stepped portion (414*a*) protruding radially outward from the outer peripheral surface of the root portion, wherein the stepped portion may have the thick portion (414*b*) that protrudes from at least a part of the outer peripheral surface and spans an upper surface of the stepped portion, and wherein in the cutting step (second cutting step), the thick portion is cut and the cut surface A is formed on at least a part of the outer peripheral surface of the stepped portion (nineteenth configuration).

In the nineteenth configuration, the upper end of the thick portion that spans the upper surface of the stepped portion may be located below the upper end of the cylindrical wall portion in the axial direction (twentieth configuration).

In the twentieth configuration, the upper end of the thick portion that spans the upper surface of the stepped portion may be located above the upper end of the cylindrical wall portion in the axial direction (twenty-first configuration).

In the twenty-first configuration, the thick portion may protrude in the radial direction from the entire circumference of the outer peripheral surface of the stepped portion (twenty-second configuration).

The spindle motor according to an aspect of the disclosure includes: the shaft (21) that extends along the rotation axis (J) extending in the vertical direction; the base plate (41) to which the lower end of the shaft is fixed; the annular stator core (121) which is disposed on the upper surface of the base plate and surrounds the shaft; the rotor (22) that rotates about the rotation axis; and the bearing unit (13) that supports the rotor to be rotatable about the shaft as the rotation axis, wherein the base plate has the shaft through hole (415) through which the shaft is inserted, and the shaft has the shaft inclined portion (211) which is disposed at the lower end of the shaft and has an outer diameter that decreases toward the lower side in the axial direction (twenty-third configuration).

According to the disclosure, for example, the disclosure can be used for a disk drive device such as a hard disk drive.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A base plate that becomes a part of a housing of a disk drive device and is made of a metal die-cast member, comprising:
   a bottom wall portion that extends perpendicularly to a rotation axis of a disk extending in a vertical direction; and
   a cylindrical wall portion that protrudes upward from an upper surface of the bottom wall portion along the rotation axis and has a shaft through hole through which a shaft is inserted,
   wherein the cylindrical wall portion has an annular stepped portion that protrudes radially outward from an outer peripheral surface of a root portion, and
   wherein a processed surface is formed on at least a part of an outer peripheral surface of the stepped portion, and the base plate further comprises:
   a plurality of wire through holes which is arranged in a circumferential direction to penetrate the stepped portion and the bottom wall portion in an axial direction and through which wires connected to a motor are inserted, wherein
   at least one wire through hole faces the processed surface with the rotation axis interposed therebetween in a radial direction.

2. The base plate according to claim 1,
   wherein a cast surface is provided circumferentially adjacent to the processed surface in the outer peripheral surface of the stepped portion, and
   wherein the surface roughness of the processed surface is smaller than the surface roughness of the cast surface.

3. The base plate according to claim 1,
   wherein an upper end of the processed surface is located at an upper end of the outer peripheral surface of the stepped portion, and
   wherein a lower end of the processed surface is located at a lower end of the outer peripheral surface of the stepped portion.

4. The base plate according to claim 3,
   wherein a straight line passing through both circumferential ends at the upper end of the processed surface is located radially outward from an inner peripheral surface of the cylindrical wall portion when viewed from an axial direction.

5. The base plate according to claim 1,
   wherein a recess is formed by recessing a lower surface of the bottom wall portion upward in the axial direction and the plurality of wire through holes is arranged therein.

6. A spindle motor comprising:
   the base plate according to claim 1;
   the shaft that extends along the rotation axis and has a lower end inserted through the shaft through hole;
   an annular stator core that is disposed on an upper surface of the base plate and surrounds the shaft;
   a rotor that rotates about the rotation axis; and
   a bearing unit that supports the rotor to be rotatable about the shaft as the rotation axis,
   wherein the shaft has a shaft inclined portion which is disposed at a lower end of the shaft and has an outer diameter that decreases toward a lower side in an axial direction.

7. The spindle motor according to claim 6,
   wherein a minimum inner diameter of the shaft through hole is smaller than an outer diameter of an upper end of the shaft inclined portion and is larger than an outer diameter of a lower end of the shaft inclined portion before the shaft is inserted through the shaft through hole.

8. The spindle motor according to claim 6,
   wherein the shaft has a shaft contact portion that is disposed above the shaft inclined portion in the axial direction and contacts an inner peripheral surface of the shaft through hole, and
   wherein an axial length of the shaft contact portion is longer than an axial length of the shaft inclined portion.

9. The spindle motor according to claim 6,
   wherein in a cross section including the rotation axis, the shaft inclined portion has an inclination angle of 10° or less with respect to the rotation axis.

10. The spindle motor according to claim 9,
wherein in the cross section including the rotation axis, the shaft inclined portion has an inclination angle of 5° or more with respect to the rotation axis.

11. The spindle motor according to claim 6,
wherein an adhesive is disposed between the shaft inclined portion and an inner peripheral surface of the shaft through hole.

12. The spindle motor according to claim 6,
wherein the shaft through hole includes a columnar portion that extends parallel to the rotation axis and contacts an outer peripheral surface of the shaft and an enlarged hole portion that is disposed on a lower side of the columnar portion in the axial direction and has an inner diameter larger than an inner diameter of the columnar portion, and
wherein an upper end of the enlarged hole portion is located above an upper end of the shaft inclined portion in the axial direction.

13. The spindle motor according to claim 12,
wherein an inner diameter of the enlarged hole portion increases toward the lower side in the axial direction.

14. The spindle motor according to claim 12,
wherein the shaft through hole has a connecting portion that connects the columnar portion and the enlarged hole portion, and
wherein an inner diameter of the connecting portion increases toward the lower side in the axial direction.

15. A disk drive device comprising:
the spindle motor according to claim 6;
a disk that rotates about the rotation axis by the spindle motor; and
a head that reads and writes information from and to the disk.

16. The disk drive device according to claim 15,
wherein the inside of the housing is filled with a gas having a lower density than air.

17. A base plate that becomes a part of a housing of a disk drive device and is made of a metal die-cast member, comprising:
a bottom wall portion that extends perpendicularly to a rotation axis of a disk extending in a vertical direction; and
a cylindrical wall portion that protrudes upward from an upper surface of the bottom wall portion along the rotation axis and has a shaft through hole through which a shaft is inserted, wherein
the cylindrical wall portion has an annular stepped portion that protrudes radially outward from an outer peripheral surface of a root portion, and wherein
a processed surface is formed on at least a part of an outer peripheral surface of the stepped portion, and wherein
an upper end of the processed surface is located at an upper end of the outer peripheral surface of the stepped portion, and wherein
a lower end of the processed surface is located at a lower end of the outer peripheral surface of the stepped portion, and wherein
a central angle formed by both circumferential ends of the upper end of the processed surface is 90° or more and 110° or less when viewed from an axial direction.

18. The base plate according to claim 17, wherein
a straight line passing through both circumferential ends at the upper end of the processed surface is located radially outward from an inner peripheral surface of the cylindrical wall portion when viewed from an axial direction.

19. The base plate according to claim 17, further comprising:
a plurality of wire through holes which is arranged in a circumferential direction to penetrate the stepped portion and the bottom wall portion in an axial direction and through which wires connected to a motor are inserted, wherein
at least one wire through hole faces the processed surface with the rotation axis interposed therebetween in a radial direction.

20. The base plate according to claim 17, wherein
a recess is formed by recessing a lower surface of the bottom wall portion upward in the axial direction and the plurality of wire through holes is arranged therein.

* * * * *